United States Patent Office 3,553,166
Patented Jan. 5, 1971

3,553,166
MIXTURES OF IMIDAZOLE COMPLEXES AND NITROGENOUS COMPOUND AS CURING AGENTS FOR EPOXY RESINS
Carl C. Anderson, Wen-Hsuan Chang, and Rostyslaw Dowbenko, Gibsonia, Pa., assignors to PPG Industries, Inc., a corporation of Pennsylvania
No Drawing. Filed Feb. 2, 1968, Ser. No. 702,528
Int. Cl. C08g 30/14
U.S. Cl. 260—47
16 Claims

ABSTRACT OF THE DISCLOSURE

Epoxy resins are blended with a curing agent comprising a mixture of metal salt complexes of imidazoles and nitrogenous compounds such as urea, dicyandiamide, melamines and thioureas to form compositions which remain in the uncured state for long periods of time at room temperature, cure conveniently at elevated temperatures and have excellent shear strength and peel strength. These epoxy resin compositions may be used as coatings, adhesives, potting compounds, castings and laminates.

---

One of the most important problems in the use of epoxy resins is that of finding an acceptable one-part epoxy composition. Using the conventional epoxy adhesives and coatings it has been necessary to employ two-part systems wherein the epoxy and curing agents are kept in separate containers until shortly before use. This is due to the lack of stability of the resin-curing agent mixture. That is, although the epoxy resin with the curing agent already incorporated can cure rapidly to a tough, infusible state when subjected to higher temperatures, the resins cure prematurely at normal room temperatures with the passing of time and hence may not be stored for reasonable periods of time prior to use. This two-part system is undesirable since shipping both components separately involves considerably more time and expense and inconvenience to the ultimate user of the epoxy resin, and mixing the two components at the time of use leads to difficulty in accurately measuring the components and thus to products with less than optimum properties.

Imidazoles are known to be very fast curing agents for epoxy resins, and compositions of the imidazoles and epoxy resins yield coatings and adhesives having excellent mechanical properties. However, these imidazoles completely lack stability in mixtures with epoxy resins at room temperature for long periods of time, and this makes them useless as curing agents for one-part epoxy coating or adhesives.

In copending application, Ser. No. 702,531, it is disclosed that complexes of imidazoles with metal salts may be blended with epoxy resins to form a one-part coating or adhesive which cures rapidly when subjected to elevated temperature, but will not cure or become viscous when stored at room temperature for long periods of time. The coatings and adhesives cure to a tough infusible state and prior to curing may be handled or transported in one package.

As has been pointed out, the metal salt complexes of imidazoles when added to epoxy resins will produce a convenient cure at temperatures in the vicinity of 350° F. As the amount of heating and the time necessary to heat the epoxy resin to cure it satisfactorily are expensive, a curing agent that can retain the good shelf life of the above epoxy resin compositions and cure the epoxy resin faster at the same temperature is an economically desirable product.

For some purposes it is necessary that epoxy resin adhesives have very high structural strength. Finding products with high strength retention at elevated temperatures would enlarge the field of uses of epoxy compositions from the present boundaries.

It has now been discovered that epoxy resins with a curing agent comprising a mixture of metal salt complexes of imidazoles and certain nitrogenous compounds cure much faster at about 350° F. than the epoxy reins cured with the metal salt complex of imidazole alone, or the nitrogenous compound alone, and also shows vastly superior structural strength while retaining the shelf stability at room temperatures. The nitrogenous compounds which have this synergistic effect with the imidazole complexes are compounds having the formula selected from the group consisting of:

(1) 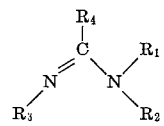

(2) 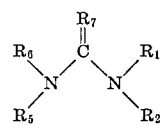

wherein $R_4$ is selected from the group consisting of R, OR, SR, CN and $NR_{(2)}$. $R_3$ is selected from the group consisting of R and CN, $R_1$, $R_2$, $R_5$ and $R_6$ are selected from the group consisting of R and CN. $R_7$ is selected from the group consisting of O, S and NR, and R is selected from the group consisting of non-metallic organic radicals having a molecular weight of 500 or less and hydrogen, and where any of two R radicals can form Z where Z is a divalent radical.

The complexes employed in the invention can be formed from essentially any imidazole or mixture of imidazoles. By the term "imidazole" is meant imidazole itself or any substituted imidazole. Examples of substituted imidazoles that may be used include alkyl imidazoles, such as 1-methylimidazole, 1,2-dimethylimidazole, 2-methylimidazole, 2-ethylimidazole and 2-ethyl-4-methylimidazole; carbamylalkyl-substituted imidazoles, such 1 - (2 - carbamylethyl -imidazole and 1-(2-carbamylethyl)-2-ethyl-4-methylimidazole; alkaryl-substituted imidazoles, such as 1-benzyl-2-methylimidazole or phenylmethylimidazole; alkenyl-substituted imidazoles such as 1-vinyl-2-methylimidazole; allyl-substituted imidazoles such as 1-allyl-2-ethyl-4-methylimidazole; carboxanilide-substituted imidazoles, such as 1-imidazolecarboxanilide and 2-methyl-1-imidazolecarboxanilide; imidazoles addition products with alpha, beta ethylenically-unsaturated compounds such as acrylates, such as alkyl acrylates, allyl acrylates, hydroxyethyl acrylates, acrylic acid, acrylamide and acrylonitrile, polycyclic imidazoles, such as benzimidazoles, naphthimidazoles, polyimidazoles, such as the condensation product of azelaic acid with o-phenylenediamine, tris(carbohydroxyethyl)amine with o-phenylenediamine, and others, such as 1-(p-toluenesulfonyl)imidazole and 2,4,6-tris(1-imidazolyl)-s-triazine. It is noted that even resinous compositions containing imidazole fragments may be used. It is further noted that complexes of mixed imidazoles, such as metal salts with imidazole and 1-methylimidazole and others may also be used.

Essentially, any metal salt/imidazole complex may be used to cure epoxy resins. Examples of metal salts are copper salts such a cupric chloride, cuprous chloride, cupric bromide, cupric fluoride, cupric nitrate, and cupric sulfate, cupric acetate, cupric trifluoroacetate, cupric methacrylate, cupric stearate, cupric octoate, cupric malonate, cupric benzoate; nickel salts such as nickel chloride, nickel fluoride, nickel sulfate and nickel tallate, nickel stearate and castor oil acid salts of nickel, calcium salts such as calcium chloride and calcium bromide; cobalt salts such as cobaltous chloride, cobaltous fluoride, cobaltous sulfate, cobaltous stearate and cobaltous octoate; zinc salts such as zinc bromide, zinc stearate, zinc octoate, zinc 2-ethylhexoate, zinc chromate and zinc chloride; mercury salts such as mercuric bromide and mercuric chloride; zirconium salts as zirconium sulfate; indium salts such as indium chloride; silver salts such as silver nitrate; chromium salts such as chromic chloride; manganese salts such as manganese chloride and manganese sulfate; tin salts such as stannous chloride; cadmium salts such as cadmium chloride; iron salts such as ferrous chloride, titanium salts such as titanium chloride, and the like. The nickel and copper salts are the preferred embodiments, as they are readily available metal salts.

It is to be understood that the above metal salts are but a few of the metal salts that may be used.

The metal salt to imidazole molar ratio is not critical. Generally, however, the metal salt to imidazole molar ratio is between about 1:1 and about 1:6.

The complexes of imidazoles and metal salts are conveniently formed by mixing the ingredients. If one or any of the ingredients are solids, solutions of the reactants in a solvent such as methanol or water may be used. If the product is solid, one may filter the resulting precipitate to obtain the complex.

These transition metal salt complexes of imidazoles are mixed with nitrogenous compounds having the formula selected from the group consisting of:

(1)

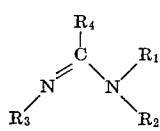

and (2)

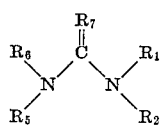

wherein $R_4$ is selected from the group consisting of R, OR, SR, CN and $NR_{(2)}$. $R_1$, $R_2$, $R_3$, $R_5$, and $R_6$ are selected from the group consisting of R and CN. $R_7$ is selected from the group consisting of O, S, and NR, and R is selected from the group consisting of non-metallic organic radicals having a molecular weight of 500 or less and hydrogen, and where any of the two R radicals can form Z where Z is a divalent radical to form the curing agents of this invention.

Generally, the compounds to be mixed with the transition metal salt complexes of imidazoles are nitrogenous. Examples of some of the nitrogenous compounds following Formula 1 are:

(1) Melamine where $R_1$ and $R_2$ are H, and $R_3$ and $R_4$ form the bivalent radical Z which is

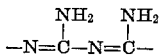

(2) Triazines such as monosubstituted melamine where $R_1$ and $R_2$ are H, and $R_3$ and $R_4$ form the bivalent radical Z which is

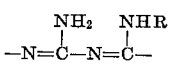

where R is an organic group defined in the previous paragraph.

(3) Monosubstituted guanamines where $R_1$ and $R_2$ are H, and $R_3$ and $R_4$ form the bivalent radical Z which is

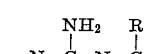

where R is an organic group defined above.

(4) Monosubstituted thiomelines where $R_1$ and $R_2$ are H, and $R_3$ and $R_4$ form the bivalent radical Z which is

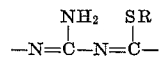

where R is an organic group defined above.

(5) Diazines such as 2,4,6-triaminopyrimidine, where $R_1$ and $R_2$ are H, and $R_3$ and $R_4$ form the bivalent radical Z which is

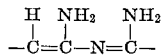

(6) 2-mercapto-4,6-diaminopyrimidine where $R_1$ and $R_2$ are H, and $R_3$ and $R_4$ form the bivalent radical Z which is

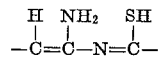

(7) 2,4-diamino-1,3,4-thiodiazole where $R_1$ and $R_2$ are H, and $R_3$ and $R_4$ form the bivalent radical Z which is

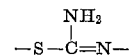

(8) 2-oxo-4,5-diaminoparabamic acid where $R_1$ and $R_2$ are H, and $R_3$ and $R_4$ form the bivalent radical Z which is

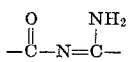

(9) N,N-diallylmelamine where $R_1$ and $R_2$ are allyl and $R_3$ and $R_4$ form the bivalent radical Z which is

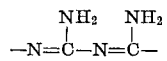

Examples of nitrogenous compounds following Formula 2 are:

(10) Urea where $R_1$, $R_2$, $R_5$, and $R_6$ are H, and $R_7$ is 0.

(11) Monomethylol urea where $R_1$, $R_2$, and $R_6$ are H, $R_7$ is 0 and $R_5$ is $CH_2OH$.

(12) N,N-dimethylol urea where $R_7$ is 0, $R_1$ and $R_6$ are H, and $R_2$ and $R_5$ are $CH_2OH$.

(13) N-butoxymethyl-N'-hydroxymethylurea where $R_7$ is 0, $R_1$ and $R_6$ are H, $R_2$ is $CH_2OH$ and $R_5$ is $CH_2OC_4H_9$.

(14) Thiourea where $R_7$ is S, and $R_1$, $R_2$, $R_6$ and $R_5$ are H.

(15) Dicyandiamide where $R_7$ is NH, $R_1$, $R_2$, $R_5$ are H, $R_6$ is CN.

(16) Triazoles such as guanazole where $R_7$ is NH, and $R_1$ and $R_5$ are H, and $R_2$ and $R_6$ form the bivalent radical Z which is

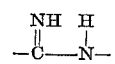

(17) Carbamylguanazole where $R_7$ is NH and $R_1$ is H, and $R_5$ is $CONH_2$, and $R_2$ and $R_6$ form the bivalent radical Z which is

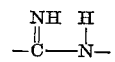

(18) N,N'-diethylthiourea where $R_7$ is S, $R_2$ and $R_6$ are H, and $R_1$ and $R_5$ are $CH_3CH_2$.

The compositions of this invention are epoxy resins blended with the imidazole metal salt complexes and the nitrogenous compounds of the formulas given above. The compositions can be formed by merely mixing the complex and the nitrogenous compound with the epoxy resin with or without the use of solvents and they can be mixed together at room temperature.

Any epoxy resin may be cured by blending the epoxy with the metal salt/imidazole complex and the nitrogenous compound and heating the blend to about 200° F. to about 500° F. The epoxy resins may be saturated or unsaturated cycloaliphatic, heterocyclic or aliphatic and may be substituted, if desired, with substituents such as halogen atoms, sulfur atoms, etser, urethanes, hydroxyl groups, mercapto group, amino group, ether radicals, acid, anhydride, ketone and aldehyde and the like. They may also be monomeric or polymeric. They may also be used in the presence of compounds or resins containing halogen atoms, sulfur atoms, hydroxy groups, mercapto groups, amino groups, ether radicals, acid group, anhydride, ester, urethane, ketone, and aldehyde groups.

The term "epoxy resin" used herein applies to monoepoxides as well as to polyepoxides. Monoepoxides polymerize when blended with the metal salt complexes of imidazoles and heated. Examples of monoepoxides which polymerize upon the addition of metal salt complexes of imidazoles and heat are propylene oxide, allyl glycidyl ether, phenyl glycidy ether, pentachlorophenyl glycidyl ether, tetrabromophenyl glycidyl ether, glycidyl methacrylate and the like.

In the preferred embodiments of this invention, the epoxy resins are polyepoxides having an average of more than 1.0 1,2-epoxy groups per average molecular weight. Among the polyepoxides which can be used herein are the polyglycidyl ethers of polyphenols, such as bisphenol A. These may be attained, for example, by etherification of a polyphenol with epichlorohydrin or dichlorohydrin in the presence of an alkali. The phenolic compound may be 2,2-bis(4 - hydroxyphenyl)propane, 4,4'-dihydroxybenzophenone, 1,1-bis(4-hydroxyphenyl)ethane, 2,2-bis(4-hydroxy-tertiarybutylphenyl)propane, bis(2 - hydroxynaphthyl) methane, 1,5-dihydroxynaphthalene, or the like. The polyphenol can also be a Novolak resin or a similar polyphenol resin.

Such polyglycidyl ethers of polyphenols correspond to the average formula:

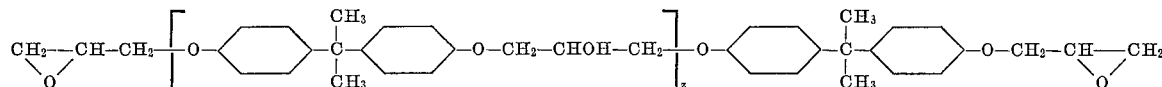

in which X represents an aromatic radical and z represents a whole or fractional small number.

Examples of this class of polyepoxides are the reaction products of bisphenol A and epichlorohydrin, which corresponds to the structure:

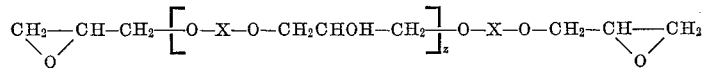

in which z represents a whole or fractional small number.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol, trimethylolpropane, and the like.

Other examples of polyepoxides that may be used in this invention are the partial fatty acid esters of the above-mentioned glycidyl polyethers of polyhydric alcohols and glycidyl polyethers of polyhydric phenols. Linseed oil and castor oil are examples of fatty acids that may be used to produce these resins.

Also suitable are polyglycidyl etsers of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terephthalic acid, 2,5-naphthalenedicarboxylic acid, dimerized linolenic acid, and the like. Examples are diglycidyl adipate and diglycidyl phthalate, and similar esters which correspond to the formula:

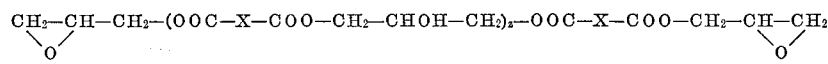

in which X represents a hydrocarbon radical, such as a phenyl or other aromatic radical or an aliphatic radical, and z represents a whole or fratcional small number.

Other examples are polyepoxides derived from the epoxidation of olefinicaly unsaturated aliphatic compounds. Included are diepoxides and higher epoxides, as well as mixtures of epoxides comprising in part one or more monoepoxides. These polyepoxides are non-phenolic and are obtained by epoxidation of olefins such as butadiene and cyclohexene, for example, by oxygen and selected metal catalysts, by perbenzoic acid, by acetaldehyde monoperacetate, or by peracetic acid.

Among the polepoxides derived from the epoxidation of alicyclic compounds are those of the formula:

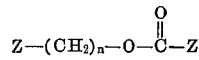

wherein $n$ is a small whole number, e.g., from 1 to 8, and Z is a radical of the structure:

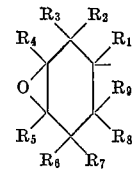

where $R_1$ through $R_9$ are hydrogen or lower alkyl radicals, i.e., having up to about 8 carbon atoms. Examples of these polyepoxides are described in United States Patent 2,716,123.

There may also be employed the corresponding diesters of the formula:

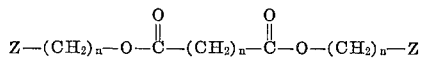

where $n$ and Z are as above. Products of this type may be produced, for example, by reducing the cyclic unsaturated aldehyde from the Diels-Alder reaction of crotonaldehyde and butadiene (or similar reactants) to the corresponding alcohol and reacting 2 moles of this alcohol with 1 mole of sebacic acid or a similar dicarboxylic acid.

Other polyepoxides from the epoxidation of olefinically unsaturated alicyclic compounds are those of the formula:

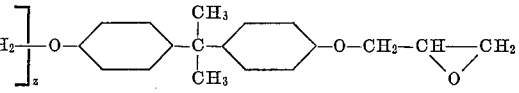

where Z and $n$ are as above and the group $(C_mH_{2m-1}O)$ is an epoxyalkyl group, preferably having from 8 to 16 carbon atoms. These compounds may be products by the epoxidation of a 3-cyclohexenylalkyl ester of a monounsaturated fatty acid, for example, with peracetic acid. Examples of these compounds are disclosed in United States Patent No. 2,786,066.

Higher epoxides are produced from the similar reaction of 3-cyclohexenylalkyl esters of polyunsaturated fatty acids, and these can also be employed in the invention. These include, for example, the polyepoxides of United States Patent No. 2,786,067 and others having the formula:

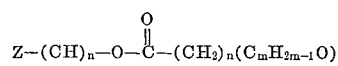

where Z and $n$ are as above and $(C_mH_{2m-3}O_2)$ is a di-epoxyalkyl radical.

Still other polyepoxides from the epoxidation of olefinically unsaturated alicyclic compounds are the epoxyalicyclic ethers which correspond to the above-described epoxyalicyclic esters. For example, these have the formula:

$$Z\text{---}(CH_2)_n\text{---}O\text{---}(CH_2)_n\text{---}Z$$

where Z and $n$ are as above. They may be obtained by the epoxidation of dicyclopentadiene.

Other examples of epoxy resins usable in this invention are epoxidized oils such as epoxidized soybean oil, cycloaliphatic diepoxides and epoxidized Novolak resins obtained by epoxidizing the condensation products of an aldehyde with a polyhydric phenol.

It is noted that any epoxy resin may be polymerized or cured with the metal salt complexes of the imidazoles and the nitrogenous compounds of this invention and that the above epoxy resins are intended to be illustrative only. In the preferred embodiment of this invention, the epoxy resins are those having an average of more than one 1,2-epoxy group per average molecular weight.

Pigments such as titanium dioxide, carbon black, and the like, fillers such as aluminum, flexibilizing agents, etc., may be added to the epoxy resin compositions. It is also possible to include in the compositions of this invention other resinous materials co-reactive with epoxy resins such as resins containing carboxyl groups such as azelaic acid, resins containing anhydrides such as nadic anhydride, polyesters containing epoxy groups, resins containing hydroxyl groups, thio groups, silicon resins containing epoxy groups such as

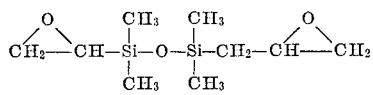

urethane resins, and resins containing amino groups. The addition of the above co-reactants may be used to impart various desirable properties to the epoxy resin compositions.

The ratio of the curing agent to the epoxy resin is not critical. Generally the blend will contain from 0.5 to 40 parts by weight of curing agent to 100 parts by weight of epoxy resin. The curing agent may also contain any proportion of imidazole complex to nitrogenous compounds. The best results, however, are obtained using curing agents containing from 1 to 98 weight percent of the nitrogenous compound.

When the epoxy resin and the curing agent are blended or ground together, with or without solvents, the composition may be stored at room temperature for long periods of time without curing. Hence, the composition may be shipped to consumers and stored prior to use. If the composition is to be used as a sheet material, it may be heated for the period of time necessary to form a hard gelled material. If the composition is to be used as a coating or adhesive, the blend is coated onto the substrate and then heated for a period of time long enough to cure the resin to a tough adherent coating on the substrate. The amount of heat needed to cure the epoxy blends depends upon the particular components, but, generally, the blends are heated to approximately 200° F. to 500° F. until the resin cures.

The epoxy blends of this invention are useful as coatings, adhesives, potting compounds, castings and laminates or reinforced products. They are especially useful in that they may be handled as one-part epoxy resins, as compared to epoxy resins which must be handled as separate parts of resin and hardener.

The epoxy resin compositions may be coated onto substrates using any of the conventional coating techniques. The compositions may also be applied as powder coatings by spraying solid mixtures of epoxides and metal salt complexes of imidazoles in powder form on a hot substrate.

The following examples set forth specific embodiments of the instant invention. However, the invention is not to be construed as being limited to these embodiments for there are, of course, numerous possible variations and modifications.

All parts and percentages in the examples, as well as throughout the specification, are by weight unless otherwise indicated.

EXAMPLES 1 TO 5

A complex of benzimidazole and cupric sulfate was prepared by adding 23.6 parts of benzimidazole in a solution of 160 parts of methanol to 12.5 parts of cupric sulfate in a solution of 50 parts of water. The mixture was cooled, the solids were filtered off and washed repeatedly with ethyl acetate and dried. The complex was a dark-colored crystalline solid.

The above complex was mixed with an epoxy resin formed by the condensation reaction product of epichlorohydrin and Bisphenol A (Epon 828) resin. The blend was a mixture of 0.25 part of the complex and 5.0 parts of the epoxy resin.

The blend was heated at 350° F. and cured in three hours. The curing time or gel time of the blend was determined to be the time in which the resin mixture became hard and impenetrable to a wooden applicator.

A blend was made of 12 parts of dicyandiamide and 100 parts of epoxy resin and heated at 350° F. and cured after 15 minutes.

Blends of the complex of benzimidazole and cupric sulfate and epoxy resin were then made up using 0.25 part of the curing agent and 5 parts of the epoxy resin, but with the curing agent comprising 1 part of complex and 20 parts of the nitrogenous compound unless otherwise indicated. The gel times were determined in the same manner as the above blends.

The results are tabulated below in Table I:

TABLE I

| Example | Curing agent | | Gel time (minutes) |
|---|---|---|---|
| | Complex | Nitrogenous | |
| Control: | | | |
| A | None | Dicyandiamide | 15 (350° F.) |
| B | Benzimidazole/cupric sulfate | None | 180 (350° F.) |
| Example: | | | |
| 1 | do | Urea | 6 (325° F.) |
| 2 | do | Diallylmelamine | 7.5 (325° F.) |
| 3 | do | Thiourea | 2.5 (325° F.) |
| 4 | do | N,N-diethylurea | 2.5 (325° F.) |
| 5 | do | Dicyandiamide* | 5.5 (325° F.) |

*Only 10 parts of dicyandiamide were used to 1 part of complex.

As can be seen from the above examples, the blends of complex and nitrogenous compounds unexpectedly cured the epoxy resins much faster at even a lower temperature than the complex alone.

EXAMPLES 6 TO 15

Blends were made of 10 parts of epoxy resin (Epon 828), 2 parts of aluminum powder as filler material, and curing agents containing varying amounts of complex and dicyandiamide. The blends were cured for 8 minutes at 350° F. The shear strength of the blends are compared in Table II below:

TABLE II.—VARIATIONS OF COMPLEX AND DICYANDIAMIDE

| Example | Complex | Parts | Parts dicyandiamide | Lap shear strength, p.s.i. |
|---|---|---|---|---|
| Control: | | | | |
| A | $CuSO_4$·2-ethyl-4-methylimidazole | 0 | 1.2 | 400 |
| B | do | 0.5 | 0 | 1,980 |
| C | do | 1.0 | 0 | 1,780 |
| Example: | | | | |
| 6 | do | 1.0 | 1.0 | 2,800 |
| 7 | do | 1.0 | 2.0 | 2,400 |
| 8 | do | 0.5 | 1.5 | 2,400 |
| 9 | do | 0.5 | 2.0 | 2,920 |
| 10 | do | 0.1 | 1.5 | 2,700 |
| 11 | do | 0.1 | 2.0 | 2,600 |
| Control: | | | | |
| D | $ZnCl_2$·2-ethyl-4-methylimidazole | 0.5 | 0 | 510 |
| Example: | | | | |
| 12 | do | 0.5 | 2.0 | 2,180 |
| 13 | do | 0.5 | 3.0 | 2,160 |
| 14 | do | 1.0 | 1.0 | 2,020 |
| 15 | do | 1.5 | 1.0 | 1,460 |

As seen from the above examples, the shear strength of the epoxy resin is substantially increased when cured with the mixture of complex and nitrogenous compound over the shear strength of the epoxy resin cured only with the nitrogenous compound and the shear strength of the epoxy resin cured only with the complex.

EXAMPLES 16 TO 63

Metal salt complexes of the imidazoles were prepared by adding from 0.03 mole to 0.5 mole of a solution of the metal salt in methanol to from 0.120 to 0.75 mole of the imidazole in methanol. The mixtures were then cooled. The solids were filtered off and washed repeatedly with ethyl acetate and dried. The complexes obtained were dark colored crystalline solids or viscous oils.

The complexes obtained were then mixed with dicyandiamide and an epoxy resin formed by the condensation reaction product of epichlorohydrin and Bisphenol A (Epon 828 resin). The blends were composed of 0.2 part of the complex, 2 parts of dicyandiamide and 10 parts of the epoxy resin.

The blends are shown below in Table III:

TABLE III

| | Complex | | | |
|---|---|---|---|---|
| | Imidazole | Moles | Salt | Moles |
| Example: | | | | |
| 16 | Im [1] | 0.40 | $CuCl_2$ | 0.10 |
| 17 | Im | 0.40 | $CuBr_2$ | 0.10 |
| 18 | Im | 0.40 | $CuF_2$ | 0.10 |
| 19 | Im | 0.60 | $NiCl_2$ | 0.10 |
| 20 | Im | 0.60 | $CoCl_2$ | 0.10 |
| 21 | Im | 0.40 | $CuSO_4$ | 0.10 |
| 22 | Im | 0.40 | $ZnCrO_4$ | 0.10 |
| 23 | Im | 0.40 | $In(BF_4)_3$ | 0.10 |
| 24 | Im | 0.40 | $Cu(NO_3)_2$ | 0.10 |
| 25 | Im | 0.40 | $Zr(SO_4)_2$ | 0.10 |
| 26 | 1-MeIm [2] | 0.40 | $CuCl_2$ | 0.10 |
| 27 | 1-MeIm | 0.40 | $CuBr_2$ | 0.10 |
| 28 | 1-MeIm | 0.40 | $CuF_2$ | 0.10 |
| 29 | 1-MeIm | 0.40 | $CuSO_4$ | 0.10 |
| 30 | 2-MeIm [3] | 0.40 | $CuCl_2$ | 0.10 |
| 31 | 2-MeIm | 0.40 | $CuBr_2$ | 0.10 |
| 32 | 2-MeIm | 0.40 | $CuSO_4$ | 0.10 |
| 33 | 2-MeIm | 0.40 | $Cu(NO_3)_2$ | 0.10 |
| 34 | 2-MeIm | 0.40 | $NiSO_4$ | 0.10 |
| 35 | 2-MeIm | 0.40 | $NiCl_2$ | 0.10 |
| 36 | 2-MeIm | 0.40 | $CoCl_2$ | 0.10 |
| 37 | $Me_2Im$ [4] | 0.40 | $CuCl_2$ | 0.10 |
| 38 | $Me_2Im$ | 0.40 | $CuBr_2$ | 0.10 |
| 39 | $Me_2Im$ | 0.40 | $CuSO_4$ | 0.10 |
| 40 | $Me_2Im$ | 0.40 | $NiCl_2$ | 0.10 |
| 41 | 2-EtIm [5] | 0.40 | $CuCl_2$ | 0.10 |
| 42 | 2-EtIm | 0.40 | $CuBr_2$ | 0.10 |
| 43 | 2-EtIm | 0.40 | $CuSO_4$ | 0.10 |
| 44 | 2-EtIm | 0.40 | $NiCl_2$ | 0.10 |
| 45 | 2-EtIm | 0.40 | $NiSO_4$ | 0.10 |
| 46 | EtMeIm [6] | 0.3 | $NiCl_2$ | 0.05 |
| 47 | EtMeIm | 0.675 | $CuSO_4$ | 0.15 |
| 48 | EtMeIm | 0.675 | $CuBr_2$ | 0.15 |
| 49 | EtMeIm | 0.675 | $CuBr_2$ | 0.15 |
| 50 | EtMeIm | 0.675 | $CuF_2$ | 0.15 |
| 51 | CIm [7] | 0.21 | $CuCl_2$ | 0.05 |
| 52 | CIm | 0.20 | $CuBr_2$ | 0.05 |
| 53 | CIm | 0.216 | $CoCl_2$ | 0.036 |
| 54 | BIm [8] | 0.24 | $CuCl_2$ | 0.06 |
| 55 | BIm | 0.20 | $CuBr_2$ | 0.05 |
| 56 | BIm | 0.22 | $CuSO_4$ | 0.055 |

TABLE III—Continued

| | Complex | | | |
|---|---|---|---|---|
| | Imidazole | Moles | Salt | Moles |
| Example: | | | | |
| 57 | BIm | 0.20 | $CoCl_2$ | 0.05 |
| 58 | BIm | 0.20 | $NiCl_2$ | 0.05 |
| 59 | BMeIm [9] | 0.22 | $CuSO_4$ | 0.055 |
| 60 | VMeIm [10] | 0.30 | $CuCl_2$ | 0.075 |
| 61 | VMeIm | 0.30 | $CuSO_4$ | 0.075 |
| 62 | AlEtMeIm [11] | 0.21 | $CuCl_2$ | 0.05 |
| 63 | AlEtMeIm | 0.21 | $CuBr_2$ | 0.05 |

Following is an explanation of the superscript numbers in Table III:

[1] Im=Imidazole.
[2] 1-MeIm=1-methylimidazole.
[3] 2-MeIm=2-methylimidazole.
[4] $Me_2Im$=1,2-dimethylimidazole.
[5] 2 EtIm=2-ethylimidazole.
[6] EtMeIm=2-ethyl-4-methylimidazole.
[7] CIm=1-(2-carbamylethyl)imidazole.
[8] BIm=Benzimidazole.
[9] BMeIm=1-benzyl-2-methylimidazole.
[10] VMeIm=1-vinyl-2-methylimidazole.
[11] AlEtMeIm=1-allyl-2-ethyl-4-methylimidazole.

In all the above examples, the epoxy resins when blended with a mixture of the metal salt complexes of imidazoles and dicyandiamide gel considerably faster than the epoxy resins blended with the complexes alone at 350° F., the blends could be stored at 120° F. for long periods of time without gelation and the blends had outstandingly high shear strength.

According to the provisions of the patent statues, there are described above the invention and what is considered its best embodiments. However, within the scope of the appended claims, it is to be understood that the invention may be practiced otherwise than as specifically described.

We claim:
1. A curable epoxy resin composition comprising an epoxy resin having an average of more than 1.0 1,2-epoxy groups per average molecular weight and a curing agent comprising
  (1) a metal salt complex of an imidazole and
  (2) a compound having a formula selected from the group consisting of:

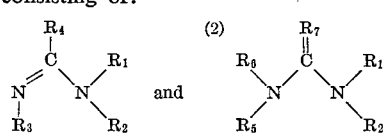

wherein $R_4$ is selected from the group consisting of R, OR, SR, CN, and $NR_{(2)}$; $R_1$, $R_2$, $R_3$, $R_5$, and $R_6$ are selected from the group consisting of R and CN, $R_7$ is selected from the group consisting of O, S and NR, and R is selected from the group consisting of non-metallic organic radicals having a molecular weight of 500 or less and hydrogen, and where any two of the radicals $R_1$, $R_2$, $R_3$, $R_4$, $R_5$, $R_6$ and $R_7$ can form Z where Z is a divalent organic radical.

2. The curable epoxy resin composition of claim 1 wherein the curing agent comprises a mixture of a metal salt complex of an imidazole and dicyandiamide.

3. The curable epoxy resin composition of claim 1 wherein the curing agent comprises a mixture of a metal salt complex of an imidazole and urea.

4. The curable epoxy resin composition of claim 1 wherein the curing agent comprises a mixture of a metal salt complex of an imidazole and thiourea.

5. The curable epoxy resin composition of claim 1 wherein the curing agent comprises a mixture of a metal salt complex of an imidazole and diallylmelamine.

6. The curable epoxy resin composition of claim 1 wherein the metal salt complex of an imidazole is prepared from a cupric salt.

7. The curable epoxy resin composition of claim 1 wherein the metal salt complex of an imidazole is prepared from a nickel salt.

8. The curable epoxy resin composition of claim 1 wherein the blend of epoxy resin and curing agent comprises from about 0.5 weight percent to about 40 weight percent of the curing agent.

9. The curable epoxy resin composition of claim 1 wherein the curing agent comprises from 1 to 98 weight percent of the nitrogenous compound.

10. The composition of claim 1 wherein the complex of the curing agent has a metal salt/imidazole molar ratio from 1:1 to 1:6.

11. The composition of claim 1 wherein the epoxy resin comprises a polyglycidyl ether of a polyphenol.

12. The composition of claim 1 wherein the epoxy resin comprises a polyglycidyl ester of a polycarboxylic acid.

13. The composition of claim 1 wherein the epoxy resin is derived from the epoxidation of olefinically unsaturated aliphatic compounds.

14. The heat cured product of the composition of claim 1.

15. An article of manufacture comprising a body having a surface with an adherent layer thereon of the heat-cured product of claim 14.

16. The method of making a heat resistant epoxy resin consisting essentially of blending an epoxy resin having an average of more than 1.0 1,2-epoxy group per average molecular weight with a curing agent comprising
(1) a metal salt complex of an imidazole and
(2) a compound having a formula selected from the group consisting of

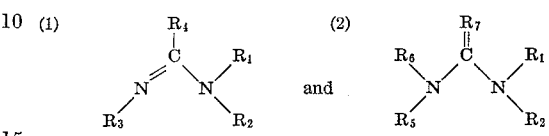

wherein $R_4$ is selected from the group consisting of R, OR, SR, CN and $NR_{(2)}$; $R_1$, $R_2$, $R_3$, $R_5$ and $R_6$ are selected from the group consisting of R and CN, $R_7$ is selected from the group consisting of O, S, and NR, and R is selected from the group consisting of non-metallic organic radicals having a molecular weight of 500 or less and hydrogen, and where any of two of the radicals $R_1$, $R_2$, $R_3$, $R_4$, $R_5$, $R_6$ and $R_7$ can form Z where Z is a divalent radical and heating the blend to cure.

References Cited
UNITED STATES PATENTS
2,803,609    8/1957    Schlenker _____ 260—47
3,018,262    1/1962    Schroeder _____ 260—47Ep

FOREIGN PATENTS
1,084,667    9/1967    Great Britain _____ 260—47

WILLIAM H. SHORT, Primary Examiner

T. E. PERTILLA, Assistant Examiner

U.S. Cl. X.R.

117—161; 161—184; 260—2, 18, 37, 59, 79, 88.3, 824, 830